Patented Nov. 21, 1933

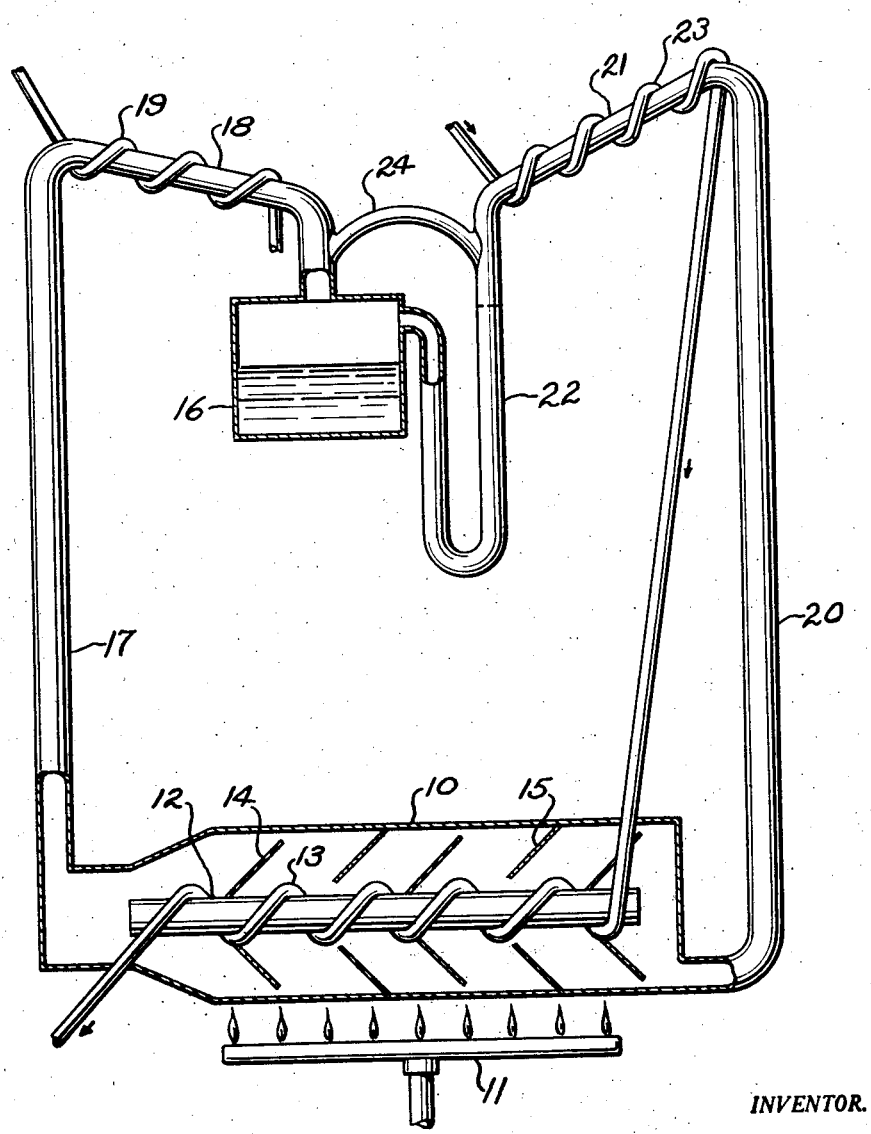

1,936,039

UNITED STATES PATENT OFFICE 1,936,039

INTERMITTENT ABSORPTION REFRIGERATING SYSTEM

Harry C. Shagaloff, Evansville, Ind., assignor to Electrolux Servel Corporation, New York, N. Y., a corporation of Delaware Application June 19, 1931. Serial No. 545,382

15 Claims. (Cl. 62—118)

This invention relates to refrigeration and more specifically to absorption refrigerating systems of the intermittent type.

An object of the invention is to provide an intermittent absorption refrigerating system having an improved efficiency without an increase in heat input or an increase in the quantity of water used for cooling purposes.

A futher object of the invention is to provide an intermittent absorption refrigerating system employing a plurality of refrigerants.

Other objects and advantages will be apparent from the following description taken in connection with the accompanying drawing which shows an absorption refrigerating system of the intermittent type contemplated by this invention.

Referring to the drawing, a horizontal generator-absorber 10 is adapted to be heated by a gas burner 11 or any other desirable means. A member 12 within the generator-absorber supports a cooling coil 13 and baffle plates 14. Other baffle plates 15 are supported from the casing of the generator-absorber and a suitable absorbent material is packed around and between these baffles.

One end of the generator-absorber is connected to the top of evaporator 16 through conduit 17 and condenser 18, which latter is cooled by water flowing through the coil 19. The other end of the generator-absorber is connected to the evaporator through conduit 20, condenser 21, and U-tube liquid trap vapor seal 22. The condenser 21 is cooled by water flowing through cooling coil 23 which is connected in series with the generator-absorber cooling coil 13. A vent or by-pass pipe 24 over the evaporator and liquid trap connects condensers 18 and 21 at their ends which communicate with the evaporator.

Any two refrigerants may be used in this system which meet the requirements that their vapors be miscible but chemically inert under operating conditions of the apparatus; that they be immiscible in the liquid phase; and that one of them be inert with respect to the absorbent. For example, ammonia and isobutane may be used as the refrigerants with calcium or strontium chloride as the absorbent.

During the generating cycle cooling water flows only through coil 19 of condenser 18. Ammonia gas is expelled from the absorbent in the generator-absorber by heat and passes through conduit 17 to condenser 18 where it is liquefied, the liquid ammonia passing into the evaporator where it sinks below the isobutane which stands in the evaporator and the trap 22. Ammonia gas also fills conduit 20 and condenser 21 but it is not condensed because of the high temperature since no water is flowing through the coil 23 of the condenser during this cycle.

When all the ammonia has been expelled from the absorbent the heat is turned off and cooling water is circulated through cooling coils 13 and 23 of the generator-absorber and condenser 21 respectively. During the refrigerating cycle both ammonia and isobutane evaporate, absorbing heat from the surrounding medium. The pressure in the system during this cycle is substantially equal to the sum of the pressures of the ammonia and isobutane at the evaporator temperature. The refrigerant gas mixture flows through conduit 17 to the generator-absorber 10 where the ammonia is absorbed and the heat of absorption is removed by the cooling water flowing through coil 13.

The isobutane gas is chemically inert with respect to the absorbent in the generator-absorber and passes through conduit 20 to the condenser 21. As the ammonia gas is absorbed in the generator-absorber 10 and the pressure in the system remains constant, the partial pressure of the isobutane gas increases as it passes through the generator-absorber. The increase in pressure of the isobutane gas is equal to the difference in the partial pressure of the ammonia gas in conduit 17 and that in conduit 20. With this increase in pressure and the reduction in temperature by the cooling water in coil 23 around the condenser 21 the isobutane condenses and flows through the trap 22 back to the evaporator and the cycle is repeated.

Ammonia gas which is not absorbed in the generator-absorber and which flows with the isobutane into the condenser 21 can pass through the vent pipe 24 back to the generator-absorber. During the refrigerating cycle cooling water flows first through the coil 23 of condenser 21 and then through coil 13 of the generator-absorber 10 so that the condenser 21 is at a lower temperature than the generator-absorber whereby the isobutane will liquefy only in the condenser.

By using the same cooling water for the isobutane condenser 21 and the generator-absorber 10, very little additional water is required as compared to the present type of intermittent absorption refrigerating systems. The heat input during the generating cycle is the same since the presence of the isobutane or other secondary refrigerant in no way affects the system during this period. The isobutane or other secondary refrigerant, however, is always available during the refrigerating cycle whereby high efficiency is obtained.

It is apparent that many changes and modifications may be made within the scope of this invention,—for instance, the absorbent may be a liquid such as water instead of a solid as herein described. The use of an absorption liquid merely necessitates the substitution of a suitable generator-absorber, well known in the art, for the generator-absorber herein described.

It will be apparent to those skilled in the art that various other changes and modifications may be made without departing from the spirit of the invention and therefore the invention is not limited to what is shown in the drawing and described in the specification but only as indicated in the appended claims.

I claim:

1. An absorption type refrigerating system for utilizing a plurality of cooling fluids comprising, means defining a closed fluid circuit, baffles in one portion of said circuit for directing flow over an absorbent for one of the cooling fluids therein, means for alternately heating and cooling said baffled portion, a liquid chamber and a U-tube liquid trap connected in series forming another portion of said fluid circuit, a by-pass conduit over said liquid chamber and trap, and means for cooling said fluid circuit alternately on each side of said by-pass.

2. An absorption type refrigerating system for utilizing a plurality of cooling fluids comprising, means defining a closed fluid circuit, a liquid chamber and a liquid trap seal in series forming a portion of said fluid circuit, a by-pass conduit over said liquid chamber and seal, means for retaining an absorbent for one of the cooling fluids in another portion of said circuit, means for alternately heating and cooling the last said portion, and means for cooling said circuit alternately on each side of said by-pass conduit.

3. Intermittent absorption type refrigerating apparatus comprising a horizontal generator-absorber, an evaporator, a conduit from one end of said generator-absorber to the upper part of said evaporator, a condenser in said conduit, a second conduit from the other end of said generator-absorber to said evaporator, a second condenser in said second conduit, a U-tube liquid trap in said second conduit adjacent the evaporator, and a conduit between the ends of said condensers which communicate with the evaporator.

4. Intermittent absorption type refrigerating apparatus comprising a generator-absorber, an evaporator, a U-tube liquid trap connected to the upper part of said evaporator, a condenser connected between said generator-absorber and the upper part of said evaporator, a second condenser connected between said generator-absorber and said liquid trap, and a conduit between the end of the first condenser connected to the evaporator and the end of the second said condenser connected to the liquid trap.

5. An intermittent absorption type refrigerating system for utilizing a plurality of cooling fluids comprising, a generator-absorber containing an absorbent for one of the fluids, a first condenser, an evaporator, a U-tube liquid trap, and a second condenser connected in series respectively forming a closed fluid circuit, and a by-pass conduit over said evaporator and liquid trap.

6. A refrigerating system of the intermittent absorption type for utilizing a plurality of cooling fluids comprising, a generator-absorber adapted to contain an absorbent for one of the cooling fluids, a condenser, and evaporator connected respectively in series, a second condenser connected between said generator-absorber and said evaporator, and a liquid trap seal between said evaporator and said second condenser.

7. A refrigerating system of the intermittent absorption type for utilizing a plurality of cooling fluids comprising, a generator-absorber adapted to contain an absorbent for one of the cooling fluids, a condenser, and evaporator connected respectively in series, a second condenser connected between said generator-absorber and said evaporator, a liquid trap seal between said evaporator and said second condenser, and a vapor by-pass conduit between the ends of said condensers towards said evaporator.

8. A refrigerating system of the intermittent absorption type for utilizing a plurality of cooling fluids comprising, a generator-absorber adapted to contain an absorbent for one of the fluids, an evaporator, two condensers connected in parallel between said generator-absorber and said evaporator, and means for alternately cooling said condensers.

9. A refrigerating system of the intermittent absorption type for utilizing a plurality of cooling fluids comprising, a generator-absorber adapted to contain an absorbent for one of the fluids, an evaporator, two condensers connected in parallel between said generator and said evaporator, means for cooling one of said condensers during the generating period, and means for cooling the other condenser during the refrigerating period.

10. A refrigerating system of the intermittent absorption type for utilizing a plurality of cooling fluids comprising, a generator-absorber adapted to contain an absorbent for one of the cooling fluids, a condenser, and an evaporator connected respectively in series, and means for condensing and returning to the evaporator condensate of another of said cooling fluids from said generator-absorber during the refrigerating period.

11. The method of refrigerating which comprises, passing a first cooling fluid alternately through an evaporating-absorbing cycle and a generating-condensing cycle, and intermittently passing a second cooling fluid through an evaporating-condensing cycle, said fluids undergoing evaporation in the presence of each other.

12. In the method of refrigerating with an intermittent absorption system including a generator-absorber, condenser, and evaporator, and containing two cooling fluids adapted to be evaporated together in said evaporator, conducting the mixture of vaporous cooling fluids from said evaporator to said generator-absorber, the latter containing an absorbent for one of said fluids, cooling said generator-absorber to cause removal of one of said cooling fluids from the mixture by absorption, condensing the other vaporous fluid to liquid, intermittently heating said generator-absorber to expel the first cooling fluid vapor from the absorbent, and condensing the expelled vapor to liquid.

13. The method of refrigerating which comprises, evaporating two cooling fluids in the presence of each other, conducting the resulting vapor mixture into the presence of an immobile absorbent for the first of said cooling fluids, alternately cooling said absorbent to cause removal of said first cooling fluid from the mixture by absorption and heating the absorbent to expel said first cooling fluid from solution, condensing the second cooling fluid vapor to liquid during cooling of said absorbent, condensing the first cooling fluid vapor to liquid during heating of said absorbent, and again evaporating the liquid cooling fluids in the presence of each other.

14. The method of refrigerating which comprises, intermittently evaporating two cooling fluids together in one portion of a closed fluid system by cooling an absorbent for the first of said fluids in another portion of the system, alternately heating said absorbent to expel vapor of said first cooling fluid, condensing vapor of the second cooling fluid by cooling under its increased partial pressure in the system during the absorption period, and condensing expelled vapor of said first cooling fluid to liquid by cooling under its pressure in the system during the heating period.

15. The method of refrigerating which comprises, intermittently evaporating a first cooling fluid in one portion of a closed fluid system by cooling an absorbent for said fluid in another portion of the system, alternately heating said absorbent to expel vapor of said cooling fluid, condensing the expelled vapor to liquid by cooling under its pressure in the system during the heating period, evaporating a second cooling fluid by diffusion into the vapor of said first cooling fluid during evaporation of the latter, and condensing the vapor of said second cooling fluid to liquid by cooling under its increased partial pressure in the system during the absorption period.

HARRY C. SHAGALOFF.